United States Patent [19]

Gardner

[11] Patent Number: 4,909,618

[45] Date of Patent: Mar. 20, 1990

[54] MIRROR FOR VIEWING INFANT IN REAR SEAT CARRIER

[76] Inventor: Richard A. Gardner, 511 Charlotte Dr., Pittsburgh, Pa. 15236

[21] Appl. No.: 352,008

[22] Filed: May 15, 1989

[51] Int. Cl.$^4$ ............................. B60R 1/04; B60R 1/08
[52] U.S. Cl. ..................................... 350/623; 350/632; 362/135
[58] Field of Search ............... 350/612, 618, 623, 631, 350/632; 362/84, 135, 142; 248/467, 481

[56] References Cited

U.S. PATENT DOCUMENTS

| | | | |
|---|---|---|---|
| 3,809,461 | 5/1974 | Baumgardner et al. | 350/622 |
| 4,314,314 | 2/1982 | Hubner | 362/135 |
| 4,702,572 | 10/1987 | Cossey | 350/618 |
| 4,733,956 | 3/1988 | Erickson | 350/618 |
| 4,824,159 | 4/1989 | Fluharty et al. | 350/604 |

*Primary Examiner*—Bruce Y. Arnold
*Assistant Examiner*—R. D. Shafer
*Attorney, Agent, or Firm*—William J. Ruano

[57] ABSTRACT

A mirror system for enabling viewing of a baby mounted on the rear seat of the car while facing rearwardly by the normal rear view mirror. A second mirror is provided on the rear shelf of the rear seat and a baby's safety carrier is mounted on the rear seat of the car, which safety carrier is arranged so that the baby views the rear window and second mirror. Illuminating means for vehicles without factory installed overhead interior lights may be provided on the second mirror to illuminate the baby's face during night driving.

3 Claims, 1 Drawing Sheet

MIRROR FOR VIEWING INFANT IN REAR SEAT CARRIER

BACKGROUND OF THE INVENTION

In November 1983, the government passed into law the "Child Passenger Protection Act" stating that a baby must be secured in a car safety seat fastened to the rear seat (center) with the baby facing toward the rear of the vehicle. Child protection groups have further stated that this form of travel is recommended for babies up to 7–12 months old and/or 20 lbs. (whichever comes first).

Since the act was passed, great difficulty has been continually experienced by the driver of a car carrying a baby car seat carrier since the driver had to turn away from viewing the road in order to see the baby to be assured that the baby is not experiencing trouble, such as being under covers, choking or the like.

SUMMARY OF THE INVENTION

The present invention relates to a mirror system which overcomes the above disadvantages and provides the driver clear vision of a baby in a car safety carrier mounted on the rear seat of an automobile without being distracted from forward view while driving a car. The mirror system includes the driver's rear view mirror as well as a mirror on a universal mounting mounted on the rear shelf behind the rear seat just forward of the third tail light.

DESCRIPTION OF THE PREFERRED EMBODIMENT

Figure 1:
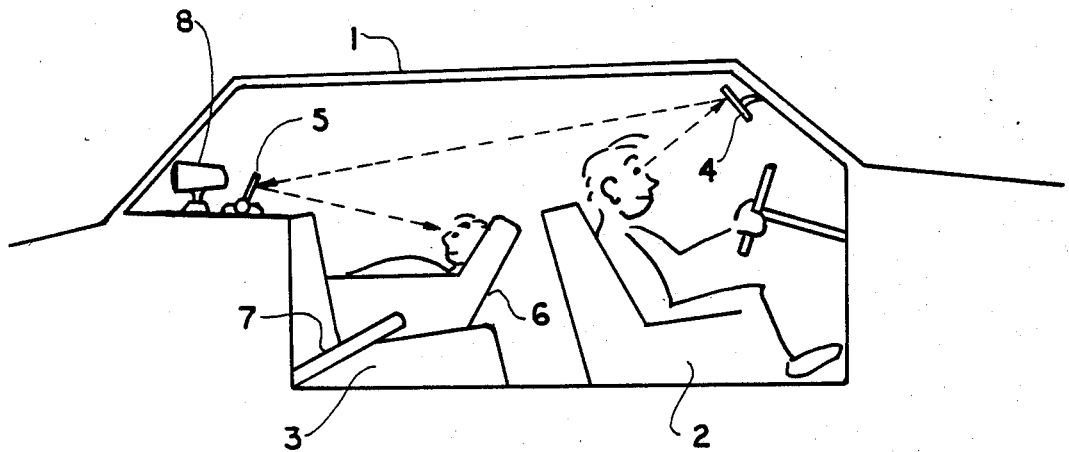
FIG. 1 is a fragmentary schematic elevational view of an automobile equipped with a mirror system embodying the present invention.
Figure 2:
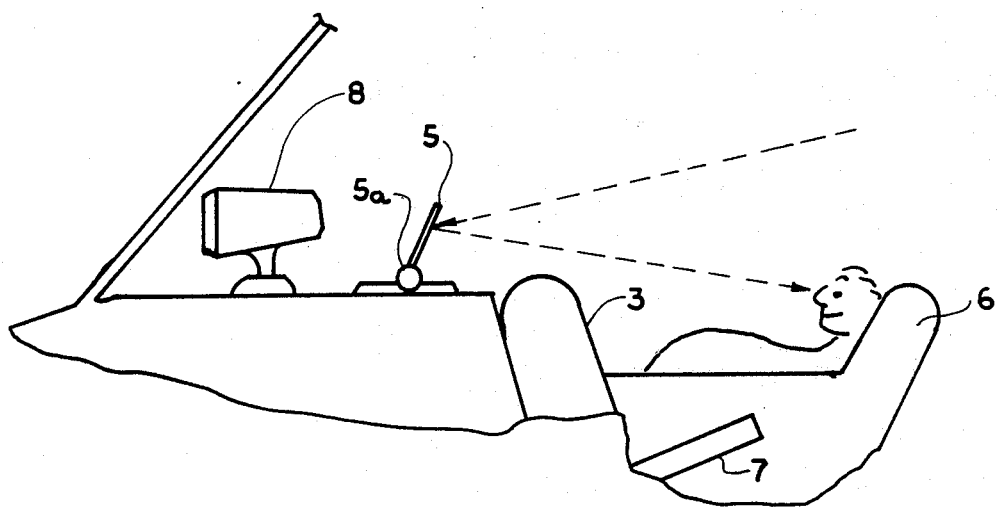
FIG. 2 is an enlarged view of the rear portion of the vehicle.
Figure 3:
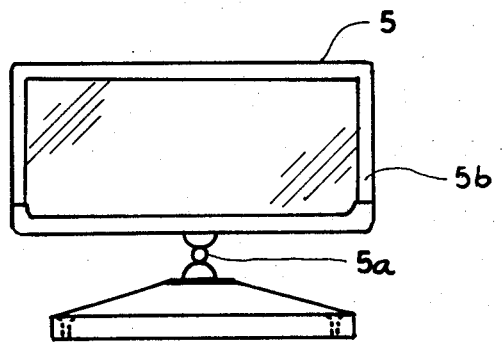
FIG. 3 is an enlarged elevational view of the rear mounted mirror shown in FIG. 1.

Referring to FIG. 1, numeral 1 denotes schematically a fragmentary portion of an automobile having a front seat 2, a rear seat 3, and a rear view mirror 4. In accordance with the present invention, an additional mirror 5, shown in greater detail in FIGS. 2 and 3, is mounted on a universal ball joint 5a to make it universally adjustable. A preferred size of the mirror is 6 inches wide by 3½ inches wide, the top being spaced about 5½ inches above the rear shelf of the rear seat 3.

The baby car safety carrier is turned so that the baby faces the rear of the car. Straps 7 securely hold car safety carrier 6 is fastened position in the center of the rear seat 3.

In operation, rear view mirror 4 stays fixed in its normal position to view through the rear window of the car. However, mirror 5 is swiveled so that the driver on looking at the rear view mirror 4, will see the face portion of the baby. Thus if the baby is in trouble such as choking or being buried under the covers, the driver will easily see the baby without turning his or her head from the rear view mirror 4.

For night driving most vehicles are equipped with an overhead light controlled by the driver. This factory installed light is adequate to illuminate the baby's face. However, for vehicles without this feature it may be desirable to utilize the third tail light 8 to illuminate the baby's face such as by providing an opening or transparent portion 8a on the red glass surrounding the third tail light. Another way of illumination would be to provide a perimetrical luminous tube or other light source 5b for illuminating the baby's face while viewing at night.

Another alternative would be a small light on a long cord powered by the auto's battery and plugged into the auto's cigarette lighter, which could also be controlled by the driver.

Thus it will be seen that I have provided an effective and relatively inexpensive mirror system to enable a lone driver to view the movements of a baby at all times without turning away from viewing ahead through the windshield and without doing anything except looking at the rear view mirror.

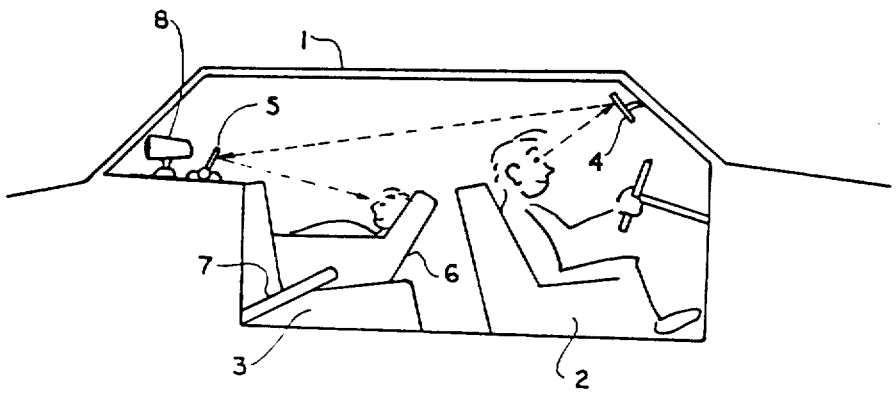

I claim:

1. In an automobile having a rear view mirror and having a baby safety carrier positioned so that a baby therein faces an automobile rear window, said automobile also having a second mirror supported on a ball joint mounted on a shelf behind an automobile rear seat and said second mirror is adjusted so that the face of the baby can be viewed from said rear view mirror.

2. A mirror system as recited in claim 1 wherein said second mirror comprises an illuminating means having a luminous tube which surrounds the perimeter of said second mirror.

3. An automobile mirror system as recited in claim 1, together with a tail light mounted on said shelf, said tail light having a transparent portion which is adjusted to illuminate said face of the baby.

* * * * *

UNITED STATES PATENT AND TRADEMARK OFFICE
CERTIFICATE OF CORRECTION

PATENT NO. : 4,909,618

DATED : March 20, 1990

INVENTOR(S) : Richard A. Gardner

It is certified that error appears in the above-identified patent and that said Letters Patent is hereby corrected as shown below:

The title page showing the illustrative figure should be deleted to appear as per attached title page.

Signed and Sealed this

Fifth Day of June, 1990

*Attest:*

HARRY F. MANBECK, JR.

*Attesting Officer*    *Commissioner of Patents and Trademarks*

United States Patent [19]
Gardner

[11] Patent Number: 4,909,618
[45] Date of Patent: Mar. 20, 1990

[54] MIRROR FOR VIEWING INFANT IN REAR SEAT CARRIER

[76] Inventor: Richard A. Gardner, 511 Charlotte Dr., Pittsburgh, Pa. 15236

[21] Appl. No.: 352,008

[22] Filed: May 15, 1989

[51] Int. Cl.⁴ .............................. B60R 1/04; B60R 1/08
[52] U.S. Cl. ................................. 350/623; 350/632; 362/135
[58] Field of Search ............... 350/612, 618, 623, 631, 350/632; 362/84, 135, 142; 248/467, 481

[56] References Cited

U.S. PATENT DOCUMENTS

| | | |
|---|---|---|
| 3,809,461 | 5/1974 | Baumgardner et al. ............ 350/622 |
| 4,314,314 | 2/1982 | Hubner ............................... 362/135 |
| 4,702,572 | 10/1987 | Cossey ................................ 350/618 |
| 4,733,956 | 3/1988 | Erickson ............................. 350/618 |
| 4,824,159 | 4/1989 | Fluharty et al. .................... 350/604 |

Primary Examiner—Bruce Y. Arnold
Assistant Examiner—R. D. Shafer
Attorney, Agent, or Firm—William J. Ruano

[57] ABSTRACT

A mirror system for enabling viewing of a baby mounted on the rear seat of the car while facing rearwardly by the normal rear view mirror. A second mirror is provided on the rear shelf of the rear seat and a baby's safety carrier is mounted on the rear seat of the car, which safety carrier is arranged so that the baby views the rear window and second mirror. Illuminating means for vehicles without factory installed overhead interior lights may be provided on the second mirror to illuminate the baby's face during night driving.

3 Claims, 1 Drawing Sheet